(12) United States Patent
Duclos et al.

(10) Patent No.: US 11,104,048 B2
(45) Date of Patent: Aug. 31, 2021

(54) DEVICE FOR DISTRIBUTING THERMOPLASTIC MATERIAL WITH IMPROVED SEAL

(71) Applicant: SIDEL PARTICIPATIONS, Octeville-sur-mer (FR)

(72) Inventors: Yves-Alban Duclos, Octeville-sur-mer (FR); Denis Cardine, Octeville-sur-mer (FR); Olivier Lamare, Octeville-sur-mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/580,866

(22) PCT Filed: Jun. 7, 2016

(86) PCT No.: PCT/FR2016/051350
§ 371 (c)(1),
(2) Date: Dec. 8, 2017

(87) PCT Pub. No.: WO2016/198774
PCT Pub. Date: Dec. 15, 2016

(65) Prior Publication Data
US 2018/0162030 A1 Jun. 14, 2018

(30) Foreign Application Priority Data
Jun. 8, 2015 (FR) ..................................... 1555203

(51) Int. Cl.
*B29C 45/22* (2006.01)
*B29C 31/04* (2006.01)
(Continued)

(52) U.S. Cl.
CPC .............. *B29C 45/22* (2013.01); *B29B 11/08* (2013.01); *B29C 31/04* (2013.01); *B29C 31/047* (2013.01);
(Continued)

(58) Field of Classification Search
CPC ....... B29C 45/22; B29C 31/04; B29C 45/045; B29C 45/232; B29C 2045/237;
(Continued)

(56) References Cited

U.S. PATENT DOCUMENTS 4,420,162 A    12/1983  Yanai et al.
4,608,724 A *   9/1986  Stengelin ................ B29C 45/07
                                                12/17 R
(Continued)

FOREIGN PATENT DOCUMENTS

CA    2 898 689 A1   7/2014
CN    103862653 A    6/2014
(Continued)

OTHER PUBLICATIONS

International Search Report, dated Aug. 26, 2016, from corresponding PCT application No. PCT/FR2016/051350.

*Primary Examiner* — Francisco W Tschen
*Assistant Examiner* — Elisa H Vera

(57) ABSTRACT

Disclosed is a device for distributing thermoplastic material to a preform molding machine, the preforms being used for manufacturing containers; the device includes at least a stationary part and a movable part, a seal that has a first sealing surface and a second sealing surface which are axially separated from each other by a gap inside which some of the thermoplastic material flows, a channel for radially constraining the thermoplastic material, and an associated cooler for radially obtaining a temperature gra-
(Continued)

dient in order to increase the viscosity of the thermoplastic material located between the sealing surfaces.

20 Claims, 10 Drawing Sheets

(51) Int. Cl.
*B29C 43/34* (2006.01)
*B29C 43/08* (2006.01)
*B29B 11/08* (2006.01)
*B29C 45/04* (2006.01)
*B29K 67/00* (2006.01)
*B29L 31/00* (2006.01)

(52) U.S. Cl.
CPC ............ B29C 45/045 (2013.01); *B29C 43/08* (2013.01); *B29C 43/34* (2013.01); *B29C 2043/3466* (2013.01); *B29K 2067/003* (2013.01); *B29L 2031/7158* (2013.01)

(58) Field of Classification Search
CPC .......... B29C 31/044; B29C 2043/3433; B29C 44/36; B29B 11/08
See application file for complete search history.

(56) References Cited

U.S. PATENT DOCUMENTS

| 7,001,168 | B2 | 2/2006 | Alberghi et al. |
| 8,858,216 | B2 | 10/2014 | Zoppas et al. |
| 2002/0070288 | A1* | 6/2002 | Bouti ................. B29C 45/1603 239/135 |
| 2004/0232604 | A1* | 11/2004 | Jordan ................ B29C 45/1704 264/572 |
| 2007/0108668 | A1* | 5/2007 | Hutchinson ............. B29C 33/04 264/521 |
| 2008/0251970 | A1* | 10/2008 | Enrietti ............... B29C 45/2703 264/319 |
| 2014/0308388 | A1* | 10/2014 | Armbruster ........... B29C 45/045 425/577 |
| 2016/0067896 | A1* | 3/2016 | Yamaguchi ............. F15B 7/001 137/625.46 |

FOREIGN PATENT DOCUMENTS

| EP | 1 551 610 B1 | 11/2006 |
| EP | 2 585 273 B1 | 10/2014 |
| SU | 1 599 221 A1 | 10/1990 |
| WO | 2011/161649 A1 | 12/2011 |

* cited by examiner

DEVICE FOR DISTRIBUTING THERMOPLASTIC MATERIAL WITH IMPROVED SEAL

This invention relates to a device for distributing thermoplastic material comprising improved sealing means.

This invention relates more particularly to a device for distributing thermoplastic material to a machine for molding preforms that are designed for the manufacturing of containers, with said device comprising at least one stationary part and one movable part that is driven in rotation in relation to said stationary part around an axis of the device and comprising sealing means arranged between at least the stationary part comprising at least one feed pipe connected to a source for supplying thermoplastic material and the movable part comprising at least one channel for distributing said thermoplastic material to units of said preform molding machine.

From the state of the art, examples of such a device for distributing thermoplastic material for a machine for molding preforms that are designed for the manufacturing of containers, in particular bottles made of PET, are known.

The sealing means of the distribution device, also called a rotary joint, should ensure the sealing between the stationary and movable parts of the device through which thermoplastic material in the molten state circulates.

The distribution device is interposed between a source for supplying thermoplastic material that is located upstream and a preform molding machine that is located downstream.

The distribution device comprises at least one inlet, located in the stationary part, which is designed to be connected to a source for supplying thermoplastic material and at least one outlet designed to be connected to the preform molding machine to supply the various molding units.

In a rotary-type preform molding machine, the distribution device is designed to transfer the molten thermoplastic material received from the feed source to injection-molding units arranged circumferentially on the periphery of a carrousel of the preform molding machine.

The document EP-2,585,273 (SIPA) describes and shows an example of a rotary-type preform molding machine that is integrated with a container manufacturing installation.

The molding machine is equipped with a number of molding units or molds into which the thermoplastic material is injected. Generally, each mold comprises a mold body bearing the impression of an outer face of the body of the preform and an oblong core bearing the impression of an inner face of the body of the preform.

To form the preform, the pasty thermoplastic material is injected between the mold body and the core, which is then withdrawn to make possible the ejection of the preform.

The preform that is obtained comprises a body of cylindrical shape in the extension of which a neck (having the final shape of that of the container) delimits an opening, with said body being closed, opposite the neck, by a bottom that is overall of hemispherical shape.

To supply such a molding machine, the feed source, also called plasticization source, generally consists of a single-screw extruder.

In a known manner, such an extruder mainly comprises a screw that is fed upstream by a hopper that comprises a granulate of thermoplastic material and that, downstream, is connected by a die to the inlet of a distribution device combined with a molding machine to supply it continuously with molten thermoplastic material.

The distribution device is fed with thermoplastic material under pressure, for example at a pressure on the order of 50 bar, and at high temperatures, for example on the order of 300° C., so as to keep the thermoplastic material in the molten state.

In a distribution device, the sealing means primarily comprise a rotary joint that connects at least one feed pipe that is located in the stationary part with multiple distribution channels located in the movable part, with said rotary joint having to make possible circulation of the thermoplastic material from the first to the second with a reliable sealing.

The sealing means are arranged, for example, in the center of the distribution device. The design of the rotary joint is to be reliable both in using the device and in preventing in particular maintenance operations in a central zone of the device, generally difficult to access.

The document EP-1,551,610 describes a device for forming predetermined quantities of thermoplastic (or synthetic) material comprising a rotary joint with contact.

The rotary joint there is made of metal, with the high temperatures making it possible only with difficulty to use a composite sealing joint.

However, such a joint with contact sometimes has a perfectible sealing, during dynamic operation, in particular because of the wear and tear that occurs between the sealing elements in contact when the movable part is driven relative to the stationary part.

The document WO-2011/161649 describes an installation for manufacturing containers made of thermoplastic material, in particular bottles, comprising a device for distributing thermoplastic material that is located downstream from an extruder that comprises an injection screw.

The distribution device is designed to distribute the molten thermoplastic material to various molding units of the rotary-type preform molding machine.

This document describes sealing means that comprise a so-called "labyrinth" system forming a joint without contact in which a portion of the thermoplastic material flows axially into the labyrinth to ensure the sealing itself, said portion of the thermoplastic material being heated there permanently to be able to be raised automatically when the movable one of the parts of said "labyrinth" system is driven in rotation in relation to the other part.

Such sealing means, however, are not satisfactory because due to their arrangement and the design of the distribution device, a plug made of thermoplastic material can become solidified in certain parts of the distribution circuit in the event of cooling.

In a preform molding machine and more particularly in the distribution device supplying it, the length of the route followed by the molten thermoplastic material is a factor that influences the quality of the thermoplastic material delivered at the outlet because the greater this length is, the longer will be the travel time and the higher the pressure exerted on the thermoplastic material.

However, there have been degradation phenomena of the thermoplastic materials such as PET, most particularly with the generation of acetaldehyde or "AA," when this travel time is too long and also a shearing of the thermoplastic material when the pressure exerted on the former is too high.

The object of this invention is in particular to propose improved sealing means for a device for distributing thermoplastic material to a machine for molding preforms designed for the manufacturing of containers such as bottles, making it possible to resolve all or a portion of the above-cited drawbacks.

For this purpose, the invention proposes a device for distributing thermoplastic material of the type described above, characterized in that said sealing means comprise a first sealing surface that is integral with the stationary part and a second sealing surface that is linked in movement to the movable part that extends radially, with said first and second sealing surfaces being separated axially from one another by a gap into which flows a portion of the thermoplastic material in circulation, at least one of said first and second sealing surfaces comprising channeling means for radially constraining the thermoplastic material when the movable part is driven in relation to the stationary part and in that said sealing means comprise at least associated cooling means to obtain a temperature gradient radially in at least one of said first and second sealing surfaces so as to increase the viscosity of said thermoplastic material located between said sealing surfaces.

Advantageously, said thermoplastic material located between said sealing surfaces whose viscosity is increased by cooling will itself form a joint in the gap.

The sealing means produced according to the invention advantageously form a joint of the type without contact, ensuring that they do not exhibit, in comparison with a joint with contact, risks of deterioration of the sealing surfaces because of wear and tear that can be attributed to friction and that can bring about sealing defects.

The sealing means are less sensitive during operation owing to the lack of guiding because of the radial arrangement of said sealing surfaces, with the joint plane extending orthogonally to the axis of rotation of the distribution device.

The pressure exerted by the thermoplastic material that is present in the gap tends to separate axially from one another said first and second sealing surfaces, which protect them respectively by avoiding any direct contact.

The purging means can be used as depressurization means to reduce the pressure exerted by the thermoplastic material inside of the distribution device, in particular inside said at least one feed pipe, and most particularly in the case of a temporary shutdown of the distribution device.

Advantageously, the distribution device can be driven in rotation "under cold conditions," including manually, in particular after an extended shutdown, in particular using depressurization means, with purging means, in the element that forms a plunger.

The compactness of the sealing means makes it possible to reduce the dead volumes of thermoplastic material and the problems linked to the expansion of the molten thermoplastic material.

Preferably, the entire route followed by the thermoplastic material inside of the distribution device is heated by means of heating means located both in the stationary part and in the movable part so as in particular to allow a start-up of the device regardless of the initial state, in particular a start-up after a temporary shutdown such as, and primarily, after an extended shutdown.

Advantageously, the associated cooling means make it possible to ensure the sealing in a permanent manner, even in the event of a shutdown of driving the movable part of the distribution device in rotation, having as a consequence that the channeling means automatically then stop constraining the thermoplastic material radially toward the inside.

According to other characteristics of the invention:

Said cooling means comprise at least one cooling circuit combined with said sealing means for keeping the thermoplastic material located radially on the periphery of the joint at a specified set-point temperature that is less than the melting point of the thermoplastic material;

The channeling means consist of at least one spiral made in one of said sealing surfaces;

The device comprises depressurization means for controlling the pressure exerted by the thermoplastic material inside of the distribution device;

The device comprises purging means for purging at least one part of the thermoplastic material that is present inside said device;

The device comprises heating means located in specified zones inside of the device for heating the thermoplastic material so as to keep said thermoplastic material at a temperature that is higher than or equal to the melting point;

The device comprises at least heating means that, combined with sealing means, are located close to at least one of said sealing surfaces to heat a part of the thermoplastic material that is present in the gap;

The device comprises purging assistance means that can introduce a pressurized fluid, in the direction opposite to that of the circulation of the thermoplastic material inside of the device, to facilitate the evacuation of the thermoplastic material during a purging operation;

The device comprises an element that forms a plunger that is introduced selectively to reduce locally the cross-section of the part of the thermoplastic material;

Said device of a general "O" design comprises a central axial passage;

The device comprises at least one distribution circuit that simultaneously supplies—from an inlet—at least two radial distribution channels that are circumferentially consecutive;

The device comprises a double circuit for distributing thermoplastic material, respectively at least a first circuit for distributing a thermoplastic material and a second circuit for distributing another thermoplastic material.

Other characteristics and advantages of the invention will emerge upon reading the following description for the understanding of which reference will be made to the accompanying drawings in which.

Figure 1:
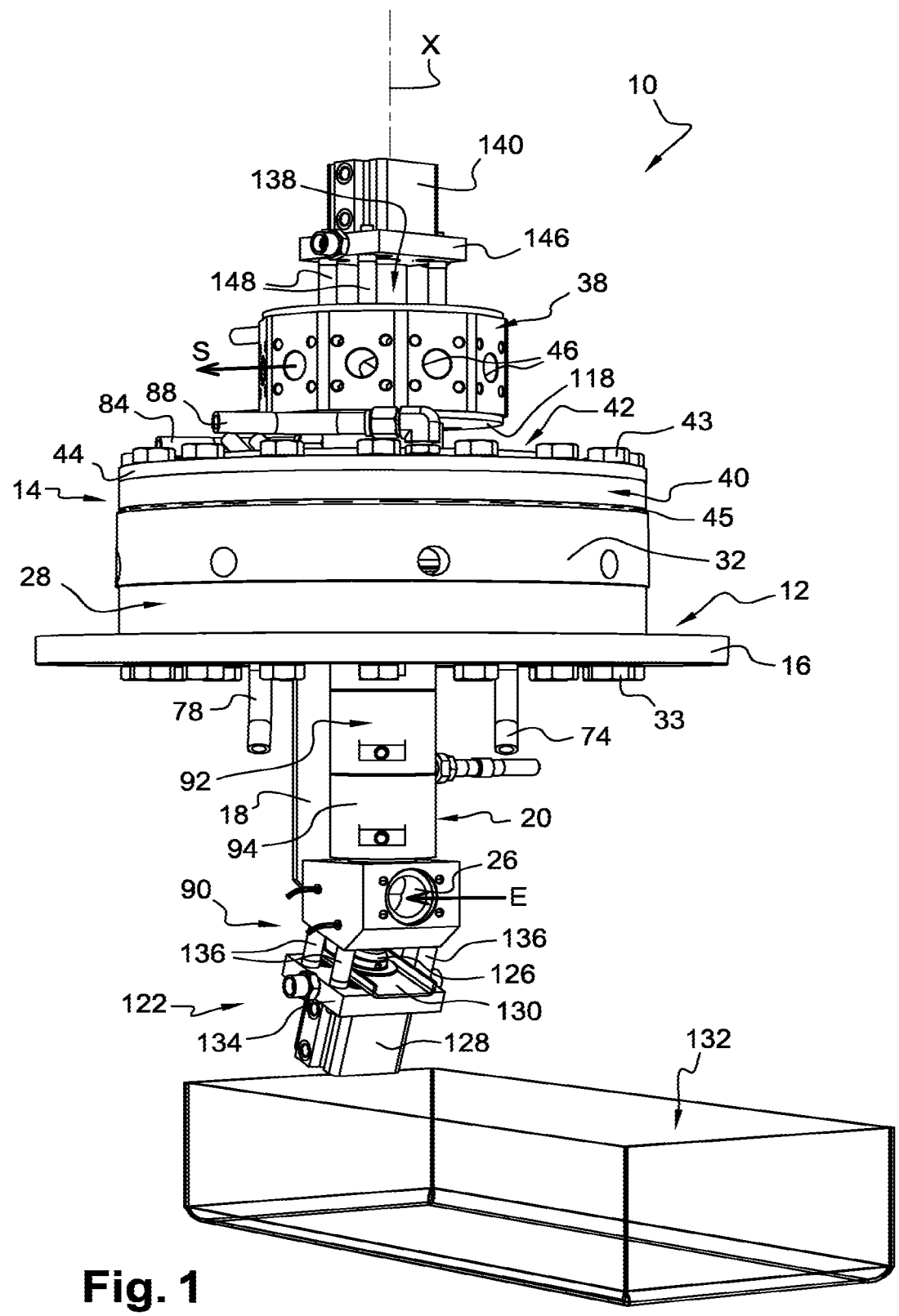
FIG. 1 is a perspective view that shows an example of a device for distributing thermoplastic material for a preform molding machine and that illustrates a first embodiment of the invention.

Hereinafter, a general "axial" direction, provided in reference to the axis of rotation of the distribution device and a "radial" direction that is orthogonal to said axial direction, will conventionally be used.

A device 10 for distributing thermoplastic material according to a first embodiment of the invention was shown in FIGS. 1 to 5.

The device 10 for distributing thermoplastic material is designed to be combined with a rotary-type preform molding machine (not shown).

The preforms made of thermoplastic material that are obtained are designed for the manufacturing of containers, such as flasks, jars or bottles.

The containers are manufactured from such hot preforms that are generally transformed by blow molding by means of at least one pressurized fluid, with or without stretching, in a mold that corresponds to the container.

The containers, such as bottles, are, for example, made of polyethylene terephthalate (PET) and are in particular but not exclusively used in the agricultural field.

As presented in the preamble, the device 10 for distributing thermoplastic material is generally supplied with thermoplastic material by extrusion means (not shown), such as a single-screw extruder.

The basic principle of single-screw extrusion is the use of an endless screw that turns inside a cylindrical case, with the extruder ensuring the bonding of the solid polymer and then the pressurization and the mixing of the molten polymer so as to supply a die arranged at the outlet.

A single-screw extruder generally comprises a feed zone that is followed by a compression zone in which bond-plastification is performed, and then a pumping zone and finally a die. The feed zone of the single-screw extruder is connected to a hopper that is filled with thermoplastic material in the solid state, for example in the form of a granulate.

The die of such a single-screw extruder is connected to at least one inlet (E) of the device 10 for distributing thermoplastic material that comprises a number of outlets (S) for distributing said molten thermoplastic material to various molding units (not shown) or molds of a preform molding machine with which said distribution device 10 is combined.

The device 10 for distributing thermoplastic material to a preform molding machine primarily comprises at least one stationary part 12 and one movable part 14, with said stationary part 12 being driven in rotation in relation to said stationary part 14 around an axis X of rotation of the device.

The stationary part 12 extends axially below the movable part 14. The stationary part 12 comprises a support plate 16, here of annular shape, from which an anti-rotational angle bar 18 extends axially downward.

Figure 2:
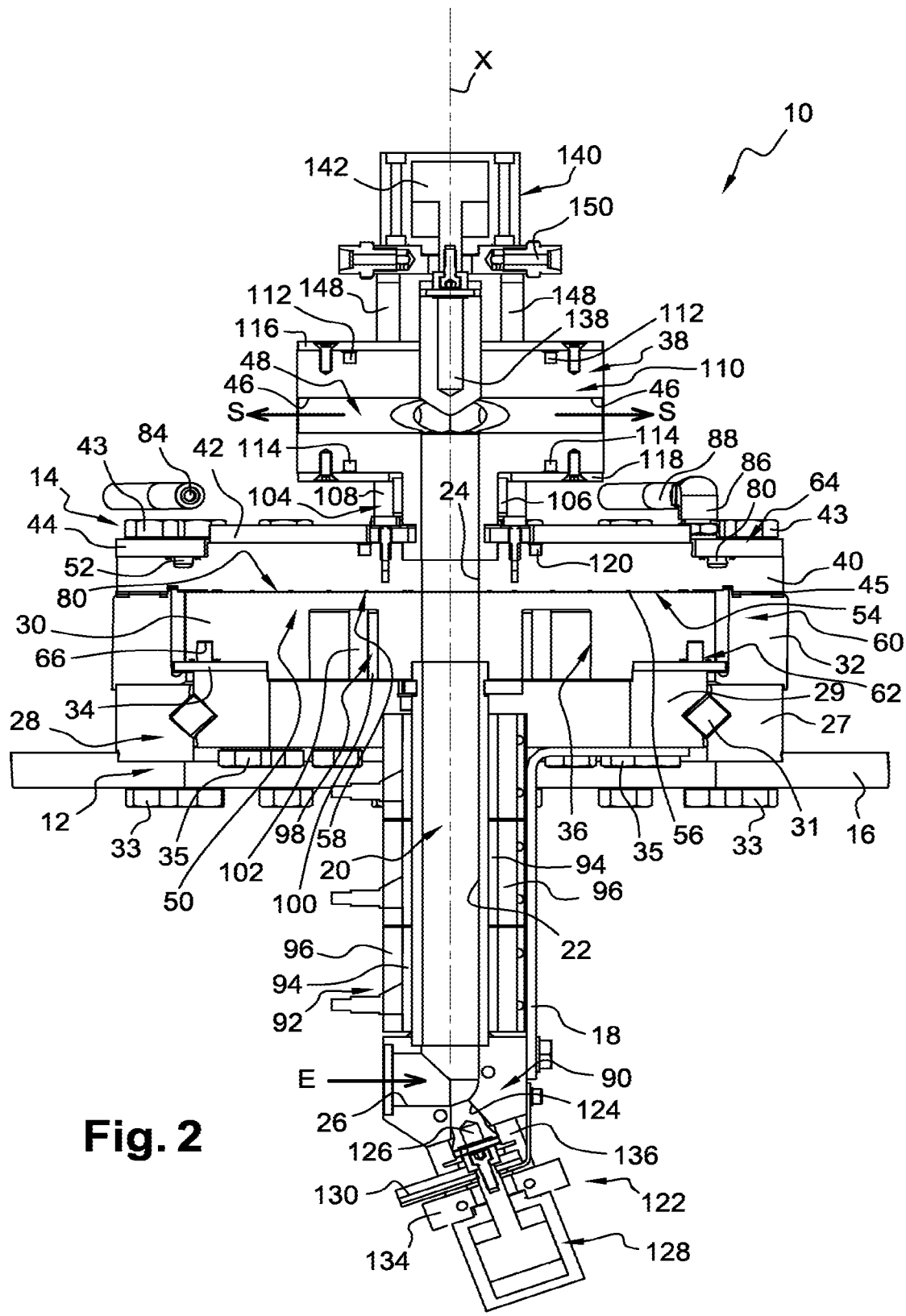
FIG. 2 is a cutaway view that shows the sealing means of the device according to FIG. 1 and that illustrates said device that operates in the distribution mode for which in particular the purging means are in the sealing position and the plunger is in the top rest position.
Figure 3:
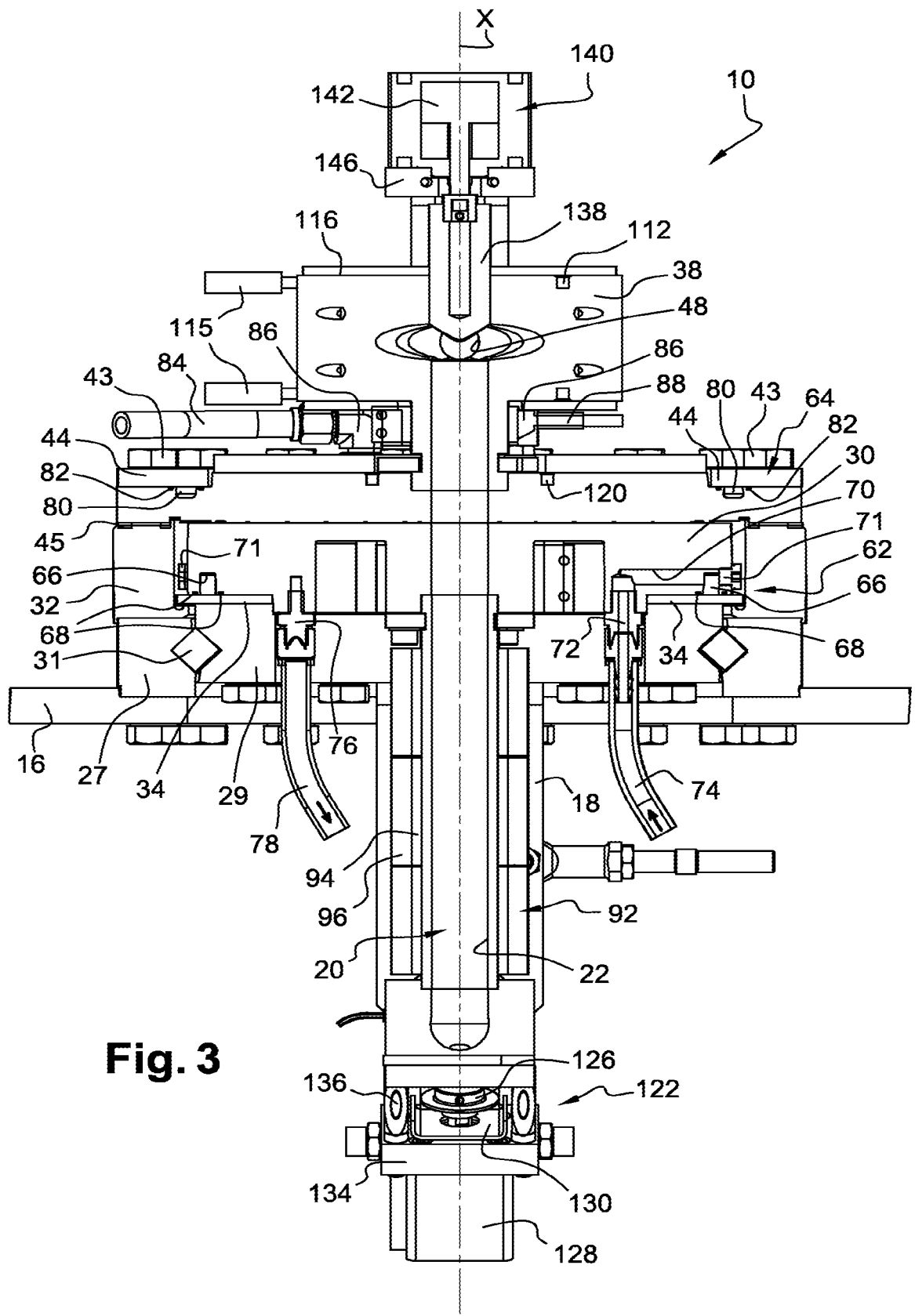
FIG. 3 is a cutaway view that, analogously to FIG. 2, shows the device according to FIG. 1 and that illustrates more particularly the cooling means combined with the sealing means.

As illustrated by FIGS. 2 and 3, the anti-rotational angle bar 18 has an upside-down "L" shape that comprises an axial orientation part from the upper end of which another radial orientation part extends.

The stationary part 12 comprises at least one feed pipe 20 that is connected to the source for supplying thermoplastic material.

In this first embodiment, the distribution device 10 comprises a main feed pipe 20 that extends axially along the axis X of rotation and that is arranged centrally in relation to said distribution device 10 and said axis X of rotation.

The feed pipe 20 extends axially in a rectilinear manner through the stationary part 12 and the movable part 14, with said feed pipe 20 respectively comprising at least one first section 22 and one second section 24.

At the lower end of said first section 22, the feed pipe 20 comprises an elbowed portion, here at a right angle, which extends via a radial orientation section whose free end comprises an opening 26 for supplying thermoplastic material from the distribution device 10.

The feed opening 26 constitutes the inlet E of said distribution device 10, with said opening 26 being designed to be connected to the outlet of the source for supplying molten thermoplastic material, such as the outlet of the die of a single-screw extruder.

The distribution device 10 comprises at least means 28 for guiding in rotation acting between the stationary part 12 and the movable part 14.

The guide means 28 are made, for example, in the form of crowns arranged radially in a concentric manner and located between the support plate 16 and a stationary plate 30.

Preferably, the guide means 28 are made in two parts, respectively a first crown 27 and a second crown 29.

The distribution device 10 comprises a first crown 27 that, of annular shape and radial orientation, is arranged radially on the outside and attached to the support plate 16.

The distribution device 10 comprises a second crown 29 that, of annular shape and radial orientation, is arranged radially on the inside of the first crown 27, with the first crown 27 being connected to the second crown 29 by means of a guide element 31.

The guide element 31 comes in, for example, the form of an annular ring that is interposed radially between the first crown 27 and the second crown 29, with said guide element 31 having, in cross-section, a general diamond shape.

Said guide element 31 is accommodated in complementary grooves that respectively comprise each of said first and second crowns 27 and 29, respectively on their inner and outer faces.

The distribution device 10 comprises a crosspiece 32 that has an annular shape and that, arranged radially on the outside of the device 10, is superposed on the first crown 27. The crosspiece 32 is interposed axially between the first crown 27 and the movable part 14.

Attachment means, such as screws in particular, are used to attach between them some of the pieces of said stationary and movable parts 12 and 14 of the distribution device 10.

Preferably, screws 33 are used to attach together the support plate 16, the first crown 27 and the crosspiece 32. The screws 33 are distributed circumferentially in a uniform manner; the heads of said screws 33 are held against a lower radial face of the support plate 16 and their bodies axially pass through said first crown 27 integrally.

Screws 35 are also used to attach together the radial orientation part of the anti-rotation corner plate 18, the second crown 29, a crosspiece 34, and the stationary plate 30.

Axially opposite the opening 26 that forms the inlet E, said first section 22 of the feed pipe 20 axially passes through said stationary plate 30 at its center.

The stationary plate 30 comprises a hollowed-out recess 36 in said plate 30 that is open axially downward.

The annular recess 36 circumferentially surrounds a radially inner portion of said plate 30, through the center of which radially inner portion the first section 22 of the feed pipe 20 passes axially and is surrounded by a radially outer portion of said plate 30.

The movable part 14 primarily comprises a distributor 38 and a rotating plate 40.

The rotating plate 40 is axially superposed in the stationary plate 30 and extends radially beyond, said rotating plate 40 being linked in rotation to the crosspiece 32 by attachment means formed by screws 43.

The rotating plate 40 comprises an upper face that is centrally covered by a washer 42.

Advantageously, the washer 42 has thermal insulation properties in such a way as to limit in particular the heat exchanges between air and the rotating plate 40.

The rotating plate 40 radially comprises a crosspiece 44 on the periphery, with said annular crosspiece 44 surrounding the insulating washer 42 and through which the screws 43 pass axially.

The screws 43 thus attach together the crosspiece 44, the rotating plate 40, and the washer 42, which is integral in rotation with the first outside crown 27 by means of the screws 33.

Preferably, a shim 45 is interposed axially between the rotating plate 40 and the washer 42, with said shim 45 being, for example, a peel-off-type shim.

Like the stationary plate 30, the pipe 20 for supplying thermoplastic material centrally passes through the rotating plate 40, more specifically the upper section 24 of said pipe 20 that extends axially beyond into the distributor 38 that is arranged above the rotating plate 40.

The upper section 24 of the feed pipe 20 communicates at its upper end with a number of distribution channels 48 that extend radially and empty through an opening 46 into the cylindrical outer axial face of the distributor 38.

The distribution channels 48 are rectilinear, orthogonal to the axis X of rotation, and are distributed circumferentially in a uniform manner in the distributor 38.

At its inner radial end, each distribution channel 48 empties into the pipe 20 for supplying thermoplastic material and distributes through its opening 46, located opposite its outer radial end, the thermoplastic material to one of the molding units of a preform molding machine.

The openings 46 of said distribution channels 48 constitute the outlet S of the distribution device 10.

The distribution device 10 comprises sealing means 50 arranged between at least the stationary part 12 that comprises at least said pipe 20 for supplying thermoplastic material and the movable part 14 that comprises the several channels 48 for distributing said thermoplastic material.

The sealing means 50 comprise a first sealing surface 52 that is integral with the stationary part 12 and a second sealing surface 54 that is linked in movement to the movable part 14 that extends radially.

Said first and second sealing surfaces 52 and 54 are separated axially from one another by a gap 56 into which flows a portion of the circulating thermoplastic material, during operation, from said at least one feed pipe 20 to said distribution channels 48.

The first sealing surface 52 is formed by the upper radial face of the stationary plate 30 of said stationary part 12 while the second sealing surface 54 is formed by the lower radial face of the rotating plate 40 of the movable part 14.

Advantageously, at least one of said first and second sealing surfaces 52 and 54 comprises channeling means 58 for automatically constraining the thermoplastic material radially from the outside to the inside when the movable part is driven in relation to the stationary part, i.e., when the rotating plate 40 is driven in rotation relative to the stationary plate 30.

The channeling means 58 consist of, for example, at least one spiral made in one of said sealing surfaces 52, 54.

Figure 5:
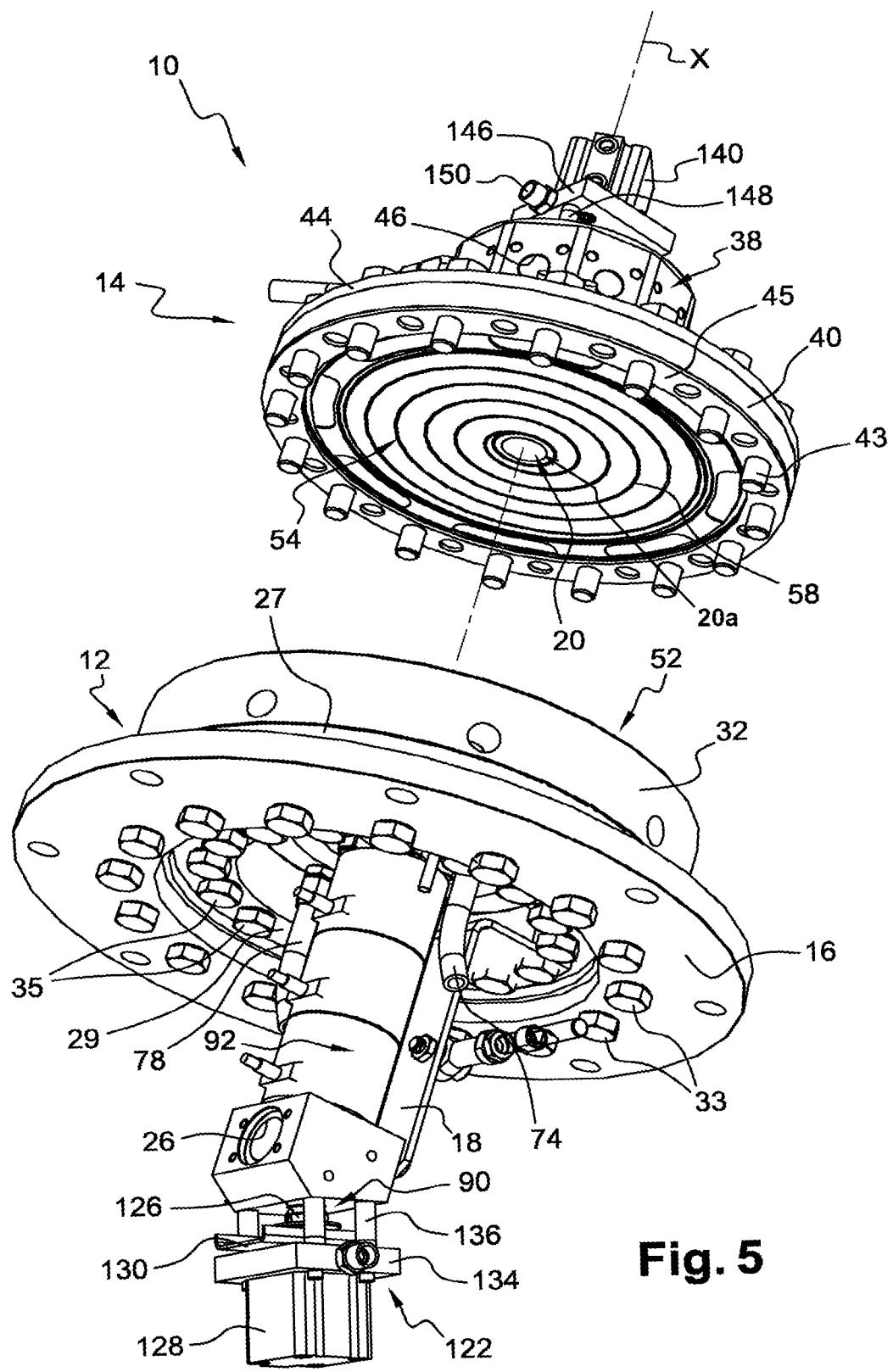
FIG. 5 is a perspective exploded view that shows, seen from below, the second sealing surface of the movable part of the device according to FIGS. 1 to 4 and that illustrates more particularly means for channeling the thermoplastic material formed by a spiral.

In this first embodiment and as illustrated most particularly by FIG. 5, the channeling means 58 are made in the second sealing surface 54 supported by the rotating plate 40 of the movable part 14.

As a variant, the channeling means 58 are made in the first sealing surface 52 supported by the stationary part 12, here by the stationary plate 30.

The spiral that forms the channeling means 58 is machined into a recess in the lower radial face of the rotating plate 40.

The winding direction of the spiral that forms the channeling means 58 from its center close to the X axis is specified in relation to the direction of rotation of the movable part 14 to constrain the thermoplastic material automatically, radially from the outside to the inside, to the feed pipe 20.

The channeling means 58 automatically constrain a portion of the thermoplastic material that has flowed into the gap 56 of the sealing means 50, in the area of a junction zone between the stationary and movable parts 12 and 14 though which the feed pipe 20 passes axially.

Advantageously, the sealing means 50 comprise at least the associated cooling means 60.

Said cooling means 60 are designed to increase the viscosity of said thermoplastic material that is located, radially on the outside, between said sealing surfaces 52 and 54 so as to form a joint with said thermoplastic material that is present in the gap 56.

The cooling means 60 comprise at least one cooling circuit combined with said sealing means 50 to keep the thermoplastic material located radially on the periphery of the joint at a specified set-point temperature (Tc) that is lower than the melting point (Tf) of the thermoplastic material.

Preferably, the cooling means 60 use at least one cooling fluid, consisting completely or partially of water, with said fluid being circulated in a regulated manner in said at least one cooling circuit.

By way of non-limiting example, when the thermoplastic material is formed by PET, the set-point temperature (Tc) is equal to 250° C., keeping in mind that the melting point (Tf) of the PET is equal to 255° C.

Advantageously, said at least one cooling circuit is controlled selectively by an associated control unit (not shown).

Preferably, such a control unit also comprises means for regulating temperature in such a way as to regulate the cooling to control the temperature of the thermoplastic material.

The regulation means (not shown) comprise, for example, at least temperature measuring means, with said temperature measuring means able in particular to measure the temperature of at least one of said sealing surfaces 52 and 54 in contact with the thermoplastic material and/or the cooling fluid that circulates in said at least one cooling circuit.

In the first embodiment, the cooling means 60 comprise first cooling means combined with the stationary part 12 and second cooling means combined with the movable part 14.

Preferably, the cooling means 60 respectively comprise a first cooling circuit 62 combined with the stationary plate 30 of the stationary part 12 and a second cooling circuit 64 combined with the rotating plate 40 of the movable part 14.

Advantageously, the first and second cooling circuits 62 and 64 are arranged to cool the outer radial part of each of said stationary plates 30 and rotating plates 40 that respectively support the first sealing surface 52 and the second sealing surface 54.

Thanks to the cooling carried out locally on the radial periphery of each of the plates 30 and 40 and therefore sealing surfaces 52 and 54, the viscosity of the thermoplastic material that is present in the gap 56 is modified to make this material more pasty and to obtain a sealing that is ensured by the thermoplastic material itself.

The cooling means 60 are controlled to obtain a temperature gradient in the radial direction in the area of each of said sealing surfaces 52, 54, with the thermoplastic material having a higher temperature close to the feed pipe 20 than on the outer radial periphery of the stationary plate 30 and rotating plate 40.

The viscosity of the thermoplastic material flowing into the gap 56 consequently varies radially according to this temperature gradient, with the viscosity being higher radially on the outside than on the inside.

Advantageously, such a viscosity gradient makes it possible to ensure the sealing radially on the outside between the stationary plate 30, on the one hand, and the rotating plate 40, on the other hand.

The viscosity gradient facilitates the action of the channeling means 58 that radially constrain—from the outside to the inside—the part of the thermoplastic material that is present in the gap 56.

The first cooling circuit 62 combined with the stationary part 12 is made in the outer radial part of the stationary plate 30.

The stationary plate 30 comprises a groove 66 that extends over all or part of the circumference of said stationary plate 30; the groove 66 is made by, for example, machining in the lower radial face of said stationary plate 30 and is open axially downward.

The groove 66 is closed in an airtight manner by means of sealing means 68, such as two joints.

Preferably, the two sealing joints 68 are arranged radially on both sides, respectively on the inside and on the outside, of the groove 66. The sealing joints 68 help with the upper radial face of the crosspiece 34 that closes the groove 66 axially at the bottom, with said crosspiece 34 being attached to the stationary plate 30 by means of the screws 35.

The groove 66 is supplied with cooling fluid by means of at least one perforation 70 that extends radially through the stationary plate 30; said perforation 70, more particularly visible in FIG. 3, communicates at one end with the groove 66.

The perforation 70 made in the stationary plate 30 empties radially, beyond the groove 66, into the outer axial face of said plate 30 and is sealed in an airtight manner, for example, here by a plug 71.

At the opposite end, the radial perforation 70 is supplied with cooling fluid by means of an end fitting 72 on which a pipe 74 for supplying cooling fluid is connected in a removable manner.

Preferably, the first cooling circuit 62 comprises an inlet and an outlet respectively connected to the groove 66 and between which the cooling fluid will circulate along a loop.

The cooling fluid is, for example, brought in via the feed pipe 74 and introduced into the groove 66 by means of the end fitting 72 and the perforation 70, and then when said fluid has passed through the loop that is formed by the annular groove 66, it is then evacuated by analogous means, namely another radial perforation (not shown) that links said groove 66 to an end fitting 76 and a drain pipe 78.

At its upper end, each of the end fittings 72 and 76 empties axially into that of the perforations with which it is associated, and the pipes 74 and 78 are consequently connected axially at the bottom of the distribution device 10 to the other lower end of the end fittings 72 and 76, for example by a so-called "quick connection" system.

The second cooling circuit 64 is combined with the rotating plate 40 is of a design analogous to the first cooling circuit 62 a second cooling circuit 64 combined with the rotating plate 40 of the movable part 14.

The second cooling circuit 64 comprises a groove 80, preferably annular and machined into the rotating plate 40, with said groove 80 being open axially upward in the upper radial face of said rotating plate 40.

The groove 80 is closed in an airtight manner by the crosspiece 44 with interposition of sealing means 82, such as joints, with the crosspiece 44 being locked axially and integral with said rotating plate 40 by means of screws 43.

The groove 80 is supplied with cooling fluid by perforations (not shown) made in the rotating plate 40 so as to link said groove 80 with a feed pipe 84 by which said cooling fluid is brought in and a drain pipe 88 by which said cooling fluid is evacuated after having circulated in the groove 80 and locally cooled the outer radial periphery of said rotating plate 40.

Preferably, the feed pipe 84 and the drain pipe 88 are respectively connected by means of connecting means 86 that are of the rotating connection type so as to make it possible for the rotating plate 40 and more generally the movable part 14 to rotate relative to said pipes 84 and 88 of the second cooling circuit 64.

Advantageously, the distribution device 10 comprises depressurization means 90 for monitoring the pressure exerted by the thermoplastic material inside of the distribution device 10.

Such depressurization means 90 make it possible in particular to avoid an excessive rise in pressure inside of the distribution device 10 when the former is shut down temporarily and when the movable part 14 that comprises the rotating plate 40 is no longer driven in rotation relative to the stationary part 30, the plate 30 and the feed pipe 20.

The depressurization means 90 can be produced, for example, in the form of a valve or any other equivalent means communicating with the inside of the distribution device 10.

The distribution device 10 comprises heating means located in specified zones inside of said device 10 for heating the parts of the device 10 with which the thermoplastic material enters into contact so as in particular to keep said thermoplastic material at a temperature (T) that is higher than or equal to the melting point (Tf).

Advantageously, the various means for heating the distribution device 10 make it possible to heat the pieces of the device 10 in contact with the thermoplastic material during its travel inside of the device 10 by preventing any cooling.

Such heating means are thus used during operation to keep the thermoplastic material at a temperature that is higher than the melting point (Tf), in particular in the event of a temporary or extended shutdown, to prevent any solidification that can take place in the event of cooling.

Advantageously, the distribution device 10 comprises thermal insulation means combined with all or part of said heating means so as to limit the thermal losses and consequently the energy consumption of said heating means integrated with the distribution device 10.

In the first embodiment, the distribution device 10 comprises at least heating means, so-called primary heating means, which are more particularly associated with the travel of the thermoplastic material inside of the distribution device 10.

The primary heating means comprise at least first heating means 92—so-called "lower" heating means—that are located axially at least around the lower section 22 of the feed pipe 20.

The function of the first heating means 92 is in particular to keep the thermoplastic material at a temperature (T) that is higher than or equal to the melting point (Tf), which material, introduced radially via the opening 26 that forms the inlet E inside of the device 10, axially raises said pipe 20 upward in the direction of the distributor 38.

As illustrated in FIGS. 1 to 6, the first heating means 92 comprise heating elements 94, here at least three in number, which are arranged one behind the other axially over the height of the section 22 that is below the feed pipe 20.

Preferably, said heating elements 94 form a cylindrical sleeve that completely surrounds the lower section 22 of the feed pipe 20.

Advantageously, each heating element 94 is combined with a thermal insulation means 96 that, arranged radially outside of the heating element, surrounds it for limiting the thermal dissipation in particular with the surrounding air.

Advantageously, second heating means 98 are combined with the central part of the stationary plate 30 that axially passes through the feed pipe 20.

Preferably and like the heating means 92, said second heating means 98 comprise at least one heating element 100 that is combined with thermal insulation means 102 that surround it circumferentially from the outside.

Said second heating means 98 are accommodated inside of the recess 36 and are mounted radially around said central part of the stationary plate 30.

Advantageously, the distribution device 10 comprises third heating means 104 that are combined with the base of the distributor 38 that connects it axially to the rotating plate 40.

Preferably, the third heating means 104 comprise at least one heating element 106 that is combined with thermal insulation means 108 that surround it radially by the outside.

The second heating means 98 and the third heating means 104 constitute heating means—so-called "intermediate" heating means—that are respectively arranged upstream and downstream from the sealing means 50 of the device 10.

Advantageously, all of the first heating means 92, second heating means 98, and third heating means 104 make it possible to keep the temperature of the thermoplastic material at a temperature that is higher than the melting point (Tf) during the travel carried out axially inside of the distribution device 10 from the inlet E.

Advantageously, the primary heating means of the distribution device 10 also comprise, in addition to said heating means 92, 98, 104 combined with the feed pipe 20, other so-called "upper" heating means to keep the temperature of the thermoplastic material at a temperature that is higher than the melting point (Tf) up to the outlet S formed by the various radial distribution channels 48.

Advantageously, the primary heating means of the distribution device 10 comprise fourth heating means 110 that are more particularly combined with said radial distribution channels 48 that the distributor 38 of the movable part 14 comprises.

The fourth heating means 110 comprise at least heating means 112 that are arranged in the upper part of the distributor 38 and heating means 114 that are arranged in the lower part of the distributor 38, with said radial distribution channels 48 being located axially between said heating means 112 and said heating means 114.

The fourth heating means 110 are, for example, produced in the form of a resistor fed electrically via connectors 115 (FIG. 3).

Figure 6:
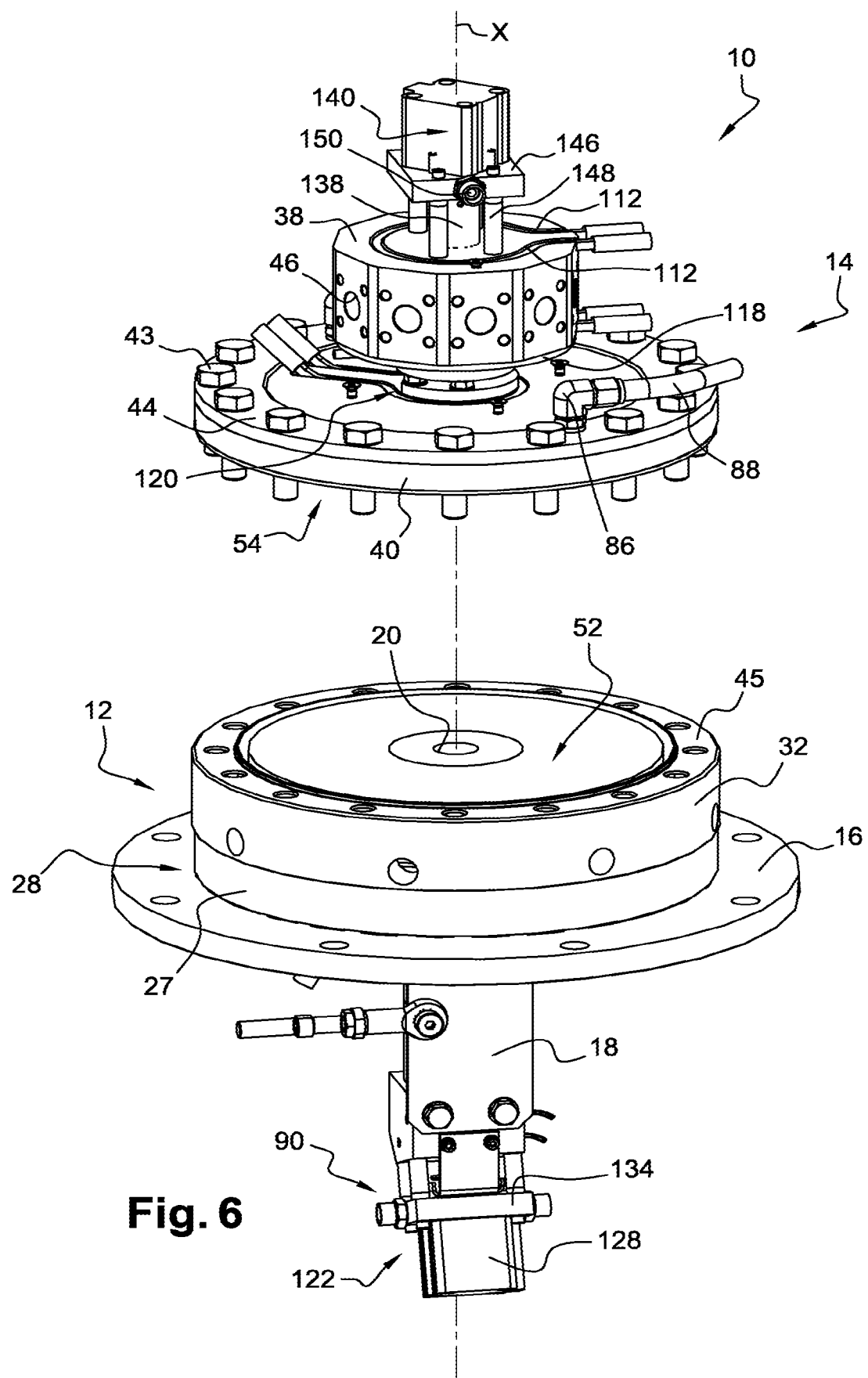
FIG. 6 is a perspective exploded view analogous to FIG. 5 that shows, seen from above, the first sealing surface of the stationary part.

The heating means 112 arranged in the upper part of the distributor 38 are more particularly visible in FIG. 6 in which the thermal insulation means that are combined with them have been made transparent so as to make them visible.

Actually, the distributor 38 advantageously comprises an upper thermal insulation washer 116 that, combined with heating means 112, covers the upper radial face of the distributor 38.

The distributor 38 comprises a lower thermal insulation washer 118 that, combined with the heating means 114, covers the lower radial face of the distributor 38.

Preferably and as illustrated in the figures, said washer 116 and thermal insulation washer 118 are respectively kept integral with the distributor 38 by the attachment means, such as screws.

Advantageously, the distribution device 10 comprises heating means, so-called secondary heating means, which are more particularly combined with sealing means 50.

In this first embodiment, secondary heating means 120 are more particularly combined with at least one rotating plate 40 that comprises the second sealing surface 54.

As illustrated by FIG. 6 in which the insulating washer 42 was made transparent, the secondary heating means 120 are housed in the upper radial face of the rotating plate 40 and located radially inside, i.e., radially opposite the second cooling circuit 64.

The distribution device 10 comprises at least secondary heating means 120 that, combined with sealing means 50, are located close to at least one of said sealing surfaces 52 and 54 for heating—at a temperature (T) that is higher than the melting point (Tf)—the part of the thermoplastic material that is present in the gap 56.

Advantageously, the secondary heating means 120 can be used in combination with the second cooling circuit 64 to obtain radially, from the inside to the outside, the desired temperature gradient between said sealing surfaces 52 and 54 and by so doing, the modification of the viscosity of the thermoplastic material that is present in the gap 56.

This possible use of said secondary heating means 120 in relation to the cooling means 60 of the sealing means 50 distinguishes them operationally from said primary heating means.

As indicated above, the various heating means (primary as well as secondary) that equip said distribution device 10 are used in particular in an operating mode, so-called distribution mode, for keeping the thermoplastic material at a temperature that is higher than the melting point (Tf) during the travel carried out inside of the distribution device 10.

Such heating means make it possible most particularly to keep the thermoplastic material at a temperature that is higher than the melting point (Tf) in the event of a temporary shutdown or for the purpose of an extended shutdown.

Advantageously, at least a portion of the heating means of the distribution device 10 can also be used in a particular operating mode, so-called intervention mode, of the device 10.

The operating mode, so-called intervention mode, of the distribution device 10 is used in particular for carrying out an operation for purging the thermoplastic material that is present inside of the distribution device 10.

The various heating means of the distribution device 10 are then advantageously used to reduce by heating the viscosity of the thermoplastic material so as to facilitate the operation for purging the thermoplastic material.

Advantageously, the distribution device 10 comprises purging means 122 for purging at least a portion of the thermoplastic material that is present inside said device 10, in particular the thermoplastic material that is present in said feed pipe 20.

Such purging means 122 are used in particular in the intervention mode for carrying out a purging operation before initiating a shutdown of the distribution device 10 with a stopping of the driving in rotation of the movable part 14.

In the first embodiment illustrated in FIGS. 1 to 6, the purging means 122 comprise at least one purging opening 124 that communicates with said feed pipe 20.

Advantageously, said at least one purging opening 124 is positioned axially at a lower end of the feed pipe 20 in such a way as to purge the thermoplastic material using gravity.

The purging means 122 comprise sealing means 126 combined with said purging opening 124 and consisting of, for example, a sealing cone.

The purging opening 124 and the associated sealing means 126 have complementary shapes, tapered here; said purging opening 124 is arranged in the elbow that connects the opening 26 that forms the inlet E to the lower end of the feed pipe 20.

Advantageously, the purging means 122 ensure a dual function and constitute said depressurization means 90.

The sealing means 126 can be controlled selectively by opening them in distribution mode to make it possible to depressurize the inside of the distribution device 10 by said purging opening 124 and this independently of the implementation of a purging operation.

Figure 4:
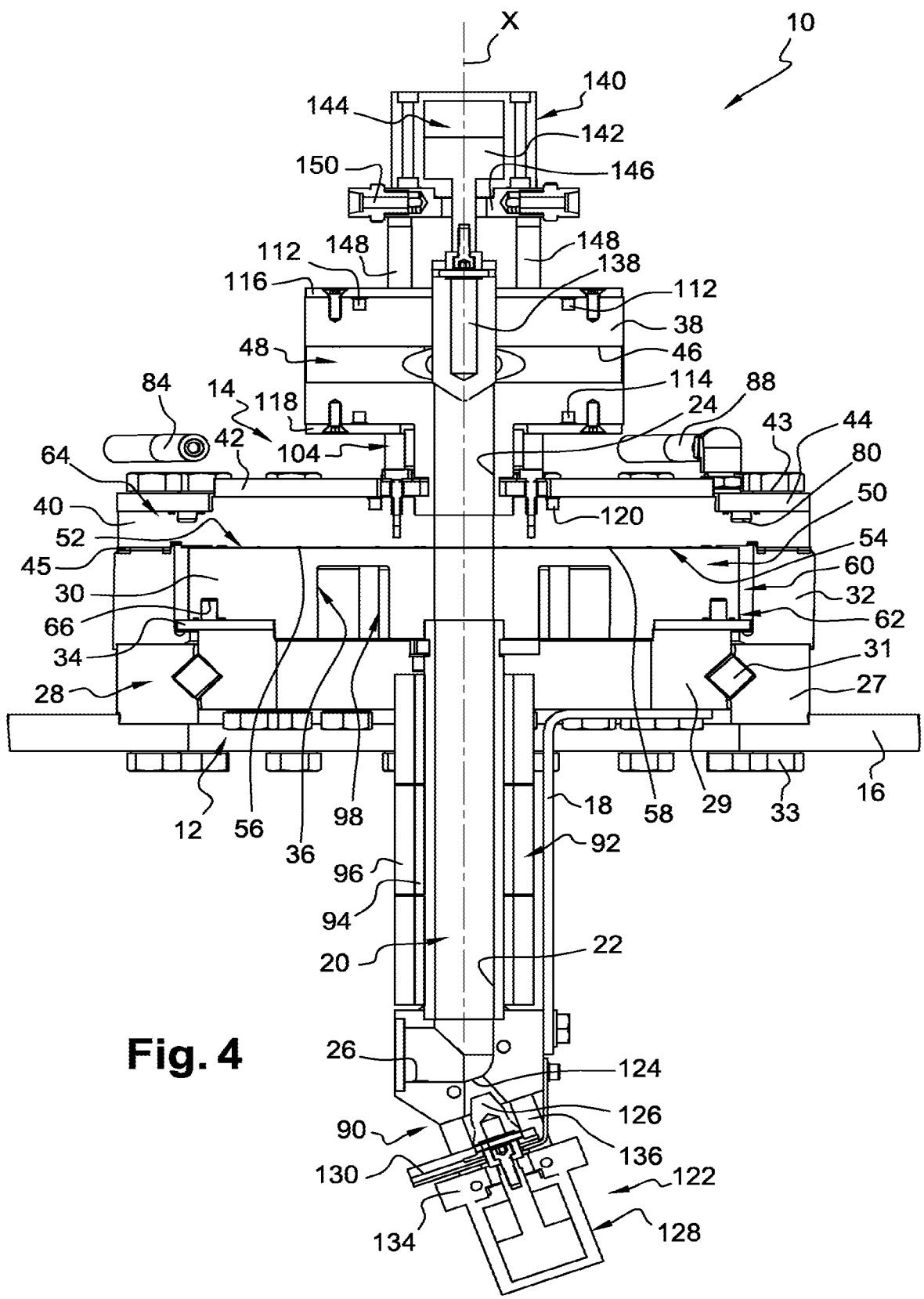
FIG. 4 is a cutaway view that is analogous to FIG. 2, which shows the sealing means of the device and that illustrates said device operating in the intervention mode in which in particular the purging means are in the purging position and the plunger is in the bottom operating position.

The sealing cone 126 is mounted to move between at least one first sealing position illustrated in FIG. 2 or 3 and a second purging position illustrated in FIG. 4.

As illustrated in the figures, the sealing cone 126 is mounted to move between at least:

A first sealing position in which said cone 126 seals said purging opening 124 to prevent the thermoplastic material from going beyond the feed pipe 20, and A second purging position in which said cone 126 is moved to make it possible for the thermoplastic material to go beyond the feed pipe 20 via said purging opening 124.

The sealing cone 126 is driven selectively in movement between said sealing and purging positions by an associated actuator 128, such as a double-action cylinder.

Advantageously, the purging means 122 comprise at least means 130 for evacuating the thermoplastic material, in particular during a purging operation.

The evacuation means 130 consist of, for example, a trough that is inclined downward and is designed to guide the thermoplastic material that escapes via the purging opening 124.

As illustrated in FIG. 1, the evacuation means 130 are arranged in relation to said purging opening 124 to evacuate the thermoplastic material toward associated recovery means 132.

The recovery means 132 are formed by, for example, a tank for collecting thermoplastic material, here in a parallelepiped shape.

Preferably, the actuator 128 is mounted on a plate 134 that is connected to the lower axial end of the feed pipe 20 by small columns 136.

Such an assembly makes it possible—in addition to the evacuation of the thermoplastic material—to protect the actuator 128 thermally in relation to the inlet E of the device 10 into which the molten thermoplastic material is introduced.

Advantageously, the distribution device 10 comprises purging assistance means (not shown).

Such purging assistance means consist in, for example, introducing a pressurized fluid in the direction opposite to the one of the circulation of the thermoplastic material inside of the device 10 in the distribution mode so as to facilitate the evacuation of the thermoplastic material during a purging operation.

The pressurized fluid of the purging assistance means consists of, for example, air.

Preferably, the distribution device 10 comprises at least one element 138 that is designed to be inserted into the area of the connecting zone between said at least one feed pipe 20 and said distribution channels 48.

Advantageously, said element 138 that forms a plunger is inserted to reduce therein the cross-section of the part of the thermoplastic material that is present between said at least one feed pipe 20 and said distribution channels 48 owing to which said part of the thermoplastic material can be locally broken, in particular in the event that solidification takes place after a temporary or extended shutdown, during which the movable part 14 would no longer be driven in rotation.

The element 138 also makes it possible, during its insertion, to push back the thermoplastic material axially downward or toward the purging means 122.

In this first embodiment, said element 138 that forms the plunger is mounted to move axially between at least one rest position corresponding to the top position illustrated in FIGS. 2 and 3, and a work position corresponding to the bottom position illustrated in FIG. 4.

In the rest position, said element 138 is retracted to release the passage of the thermoplastic material from the upper end of said at least one feed pipe 20 toward said radial distribution channels 48 of the distributor 38.

In the work position, said element 138 is inserted into the feed pipe in the area of the connecting zone to prevent the forming of a core of thermoplastic material that can become at least partially solid based on the temperature.

Preferably, said element 138 that forms a plunger is pointed at its free lower axial end.

In the work position, the element 138 totally interrupts the connection between the axial feed pipe 20 and the radial distribution channels 48.

The element 138 is driven selectively in movement by at least one associated actuator 140, with said element 138 being respectively moved axially between said rest and work positions.

The actuator 140 consists of, for example, a cylinder that comprises a piston 142 that is linked in movement to the element 138 by a rod, with the movement of the piston 142 being accomplished by pressure-controlling at least one control chamber 144 of the cylinder.

In the known manner, the actuator 140 of said element 138 (furthermore like the actuator 128 combined with the purging means 122) can consist of a single-action or double-action cylinder.

Preferably, the actuators 128, 140 are pneumatic-type double-action cylinders, of a hydraulic type.

The actuator 140 is, for example, mounted on a support plate 146 that is connected axially to the distributor 38 by means of small columns 148. The plate 146 comprises connectors 150 here for the fluid supply of the actuator 140.

As indicated above, such an assembly of the actuator 140 (like the actuator 128) makes it possible to protect it thermally.

Advantageously, the device 10 comprises thermal protection means for protecting at least the actuator 128 that is combined with purging means 122 and/or the actuator 140 that is combined with the element 138 that forms a plunger.

Below, a second embodiment of a device 210 for distributing thermoplastic material to a machine for molding preforms designed for the manufacturing of containers will be described.

By comparison in particular with the distribution device 10 according to the first embodiment shown in FIGS. 1 to 6, the distribution device 210 proposes a new design owing to which the travel carried out inside of the distributor by a thermoplastic material, from the inlet to the outlet, was considerably shortened.

The device 210 for distributing thermoplastic material comprises at least one stationary part 212 and one movable part 214 that is driven in rotation in relation to said stationary part 212 around an axis X of the device.

According to another characteristic, the distribution device 210 has a general "O" design, with said device 210 comprising a central passage P that is open axially.

The stationary part 212 and the movable part 214 respectively have an annular shape and together radially delimit said axial passage P in the center of the device 210.

Advantageously, such an "O" design makes it possible to use this passage P to pass axially through the centers of some or all of the connections or connectors that are necessary to the operation of said device 210, such as the supply of fluid for the cooling means, the supply of energy for the heating means, or else the supply of pressurized fluid for the purging assistance means.

According to another characteristic of the design of the device 210 according to this second embodiment, the distribution device 210 comprises a double circuit for distribution of thermoplastic material. The distribution device 210 is thus a two-material-type distributor.

Advantageously, such a double circuit for distribution makes it possible to mold preforms in a thermoplastic material and another thermoplastic material that comprises, for example, a given additive.

Figure 7:
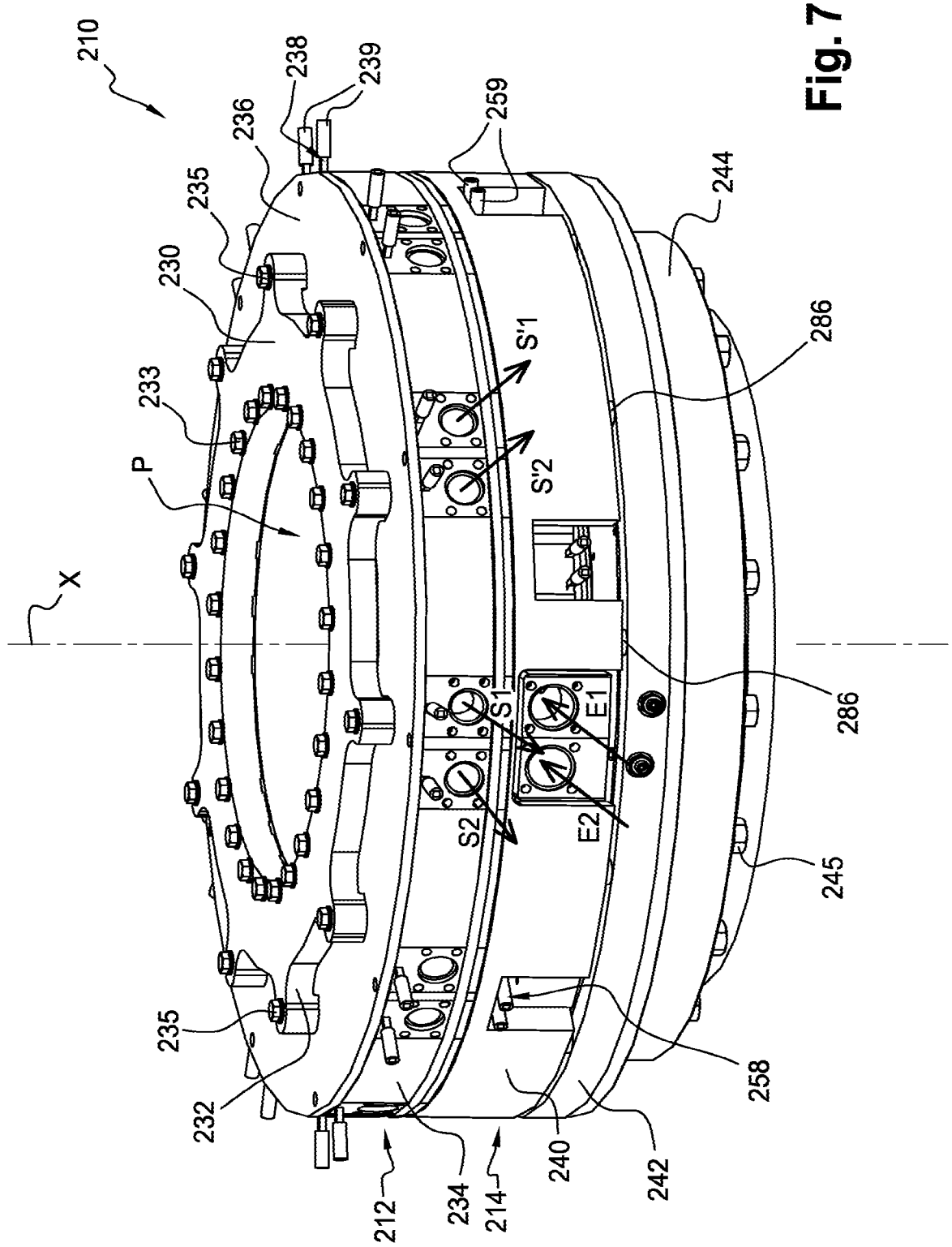
FIG. 7 is a perspective view that shows a second embodiment of a distribution device that comprises sealing means according to the invention and that illustrates a design that is also intended to reduce the travel of the thermoplastic material.

As illustrated in FIG. 7, said double circuit of the distribution device 210 comprises at least a first circuit for distribution of a thermoplastic material and a second circuit for distribution of another thermoplastic material.

The first distribution circuit comprises a first inlet E1 connected to a first device for supplying thermoplastic material (shown diagrammatically by an arrow associated with E1).

The second distribution circuit comprises a second inlet E2 that is connected to a second feed device (shown diagrammatically by an arrow associated with E2) to supply it with another material, different from the thermoplastic material of the first feed device.

Said first and second inlets E1, E2 located in the stationary part 212 are connected respectively by the circuits made in the inside of the device 210 at at least one first outlet S1 and at at least one second outlet S2 that are located in the movable part 214.

In a variant, not shown, the distribution device 210 has an analogous design but comprises a single inlet into which is introduced a thermoplastic material and at least one outlet through which said thermoplastic material is distributed.

According to the design of the distribution device 210, a thermoplastic material is introduced radially inside of said device and exits said device radially toward the outside after a short axial travel between the inlet and the outlet.

The movable part 214 comprises at least one rim 216 of a general annular shape that comprises an overall cylindrical axial part 218 and a radial part 220 that extends radially toward the outside from the lower end of the axial part 218.

The radial part 220 of the rim 216 supports an inside crown 222 that is connected to an outside crown 224 by means of at least one guide element 226 that is radially interposed between said crowns 222 and 224.

The distribution device 210 comprises guide means that, acting between the stationary part 212 and the movable part 214, are similar to those of the first embodiment and comprise an inside crown 222, an outside crown 224, and a guide element 226.

Said crowns 222 and 224 can be moved in relation to one another, the inside crown 222 being driven in rotation around the X axis by means of the rim 216 relative to the outside crown 224, which outside crown 224 forms one of the pieces of the stationary part 212 of the distributor 210.

The inside crown 222 is attached by attachment means, here screws 225, to the radial part 220 of the rim 216. The screws 225 axially pass through said radial part 220 and said inside crown 222 that comprise complementary axial holes made in each of them, the screw heads 225 resting against the upper radial face of the inside crown 222. Preferably, a washer is interposed axially between the head of each screw 225 and the inside crown 222.

The screws 225 are distributed circumferentially in a uniform manner on the inside crown 222 and the radial part 220.

Figure 10:
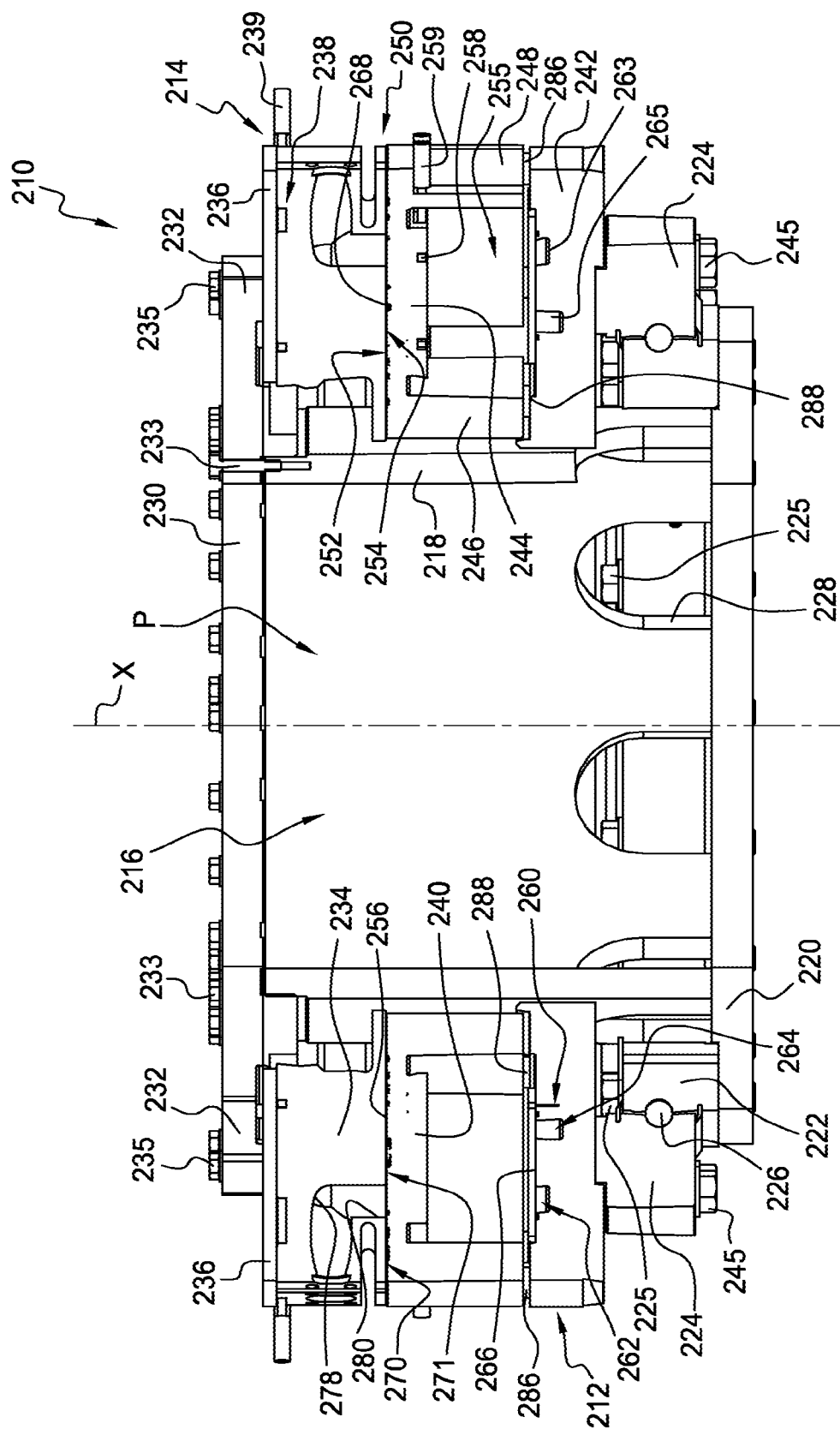
FIG. 10 is a cutaway view that shows the distribution device according to FIG. 7 and that illustrates in particular the sealing means combined with the double distribution circuit.

The axial part 218 of the rim 216 is perforated at its lower end and comprises bullet-shaped windows 228 that can be seen in particular in FIG. 10. The axial part 218 of the rim 216 is attached at its upper end to the inner part of a connecting flange 230 that extends radially.

Preferably, the means for attaching the flange 230 to the axial part 218 of the rim 216 consist of screws 233, distributed circumferentially in a uniform manner and axially passing through the axial part 218 of the rim 216 and the flange 230 against an upper radial face of which the heads of said screws 233 rest.

The flange 230 comprises, radially opposite the inner part that is integral with the axial part 218 of the rim 216, an outer part that comprises arms 232 that extend radially projecting toward the outside.

The arms 232 of the flange 230 are attached to a rotating plate 234 by means of the screw 235. The flange 230 thus snugly links in rotation the rim 216 to the rotating plate 234.

Advantageously, a thermal insulation washer 236 is interposed axially between the flange 230 and the rotating plate 234, with said washer 236 also being held in position by the screws 235.

The rotating plate 234 comprises heating means 238 that are arranged in the upper face of the plate 234. The heating means 238 are designed to heat the parts of the plate 234 through which the thermoplastic material passes so as in particular to keep the thermoplastic material at a temperature (T) that is higher than or equal to the melting point (Tf).

Figure 8:
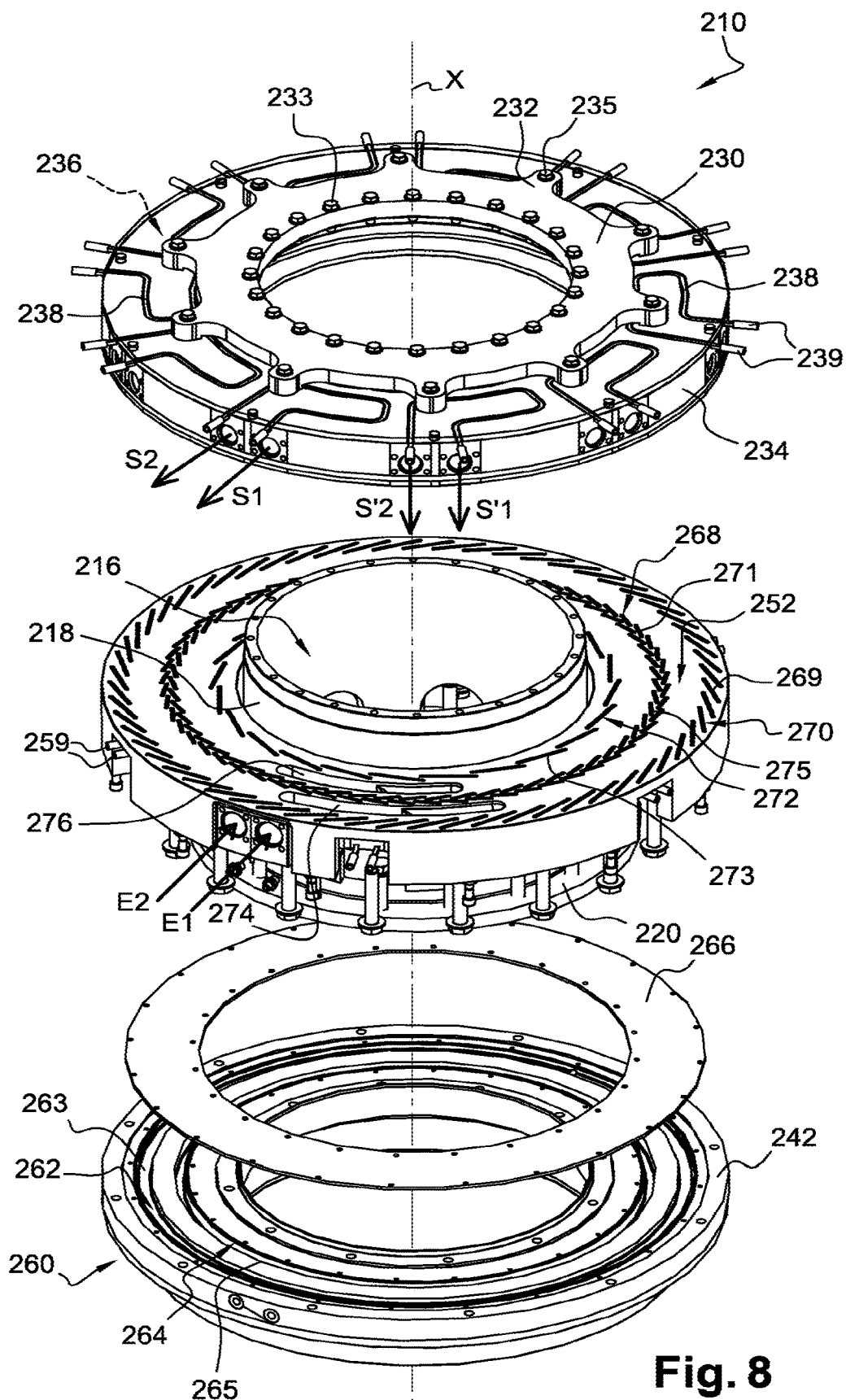
FIGS. 8 and 9 are respectively exploded views that show the distribution device according to FIG. 7 and that illustrate the sealing means combined with the double distribution circuit.

The heating means 238 combined with the rotating plate 234 are more particularly visible in FIG. 8 in which the thermal insulation washer 236 was made transparent.

Advantageously, the thermal insulation washer 236 makes it possible to limit the losses of heat to the surrounding air and improves the yield of the heating means 238 by reducing the energy consumption of the distribution device 210.

Preferably, the heating means 238 consist of, for example, resistors that are supplied with electricity by means of connectors 239.

In this second embodiment, the movable part 214 primarily comprises the rim 216, the inside crown 222, the flange 230, the washer 236, and the rotating plate 234.

The stationary part 212 comprises at least one stationary plate 240 that is arranged axially below the rotating plate 234.

The stationary plate 240 is connected to the outside crown 224 by means of a crosspiece 242 that comprises cooling means whose function will be described later.

The crosspiece 242 is linked in rotation to the outside crown 224 by means of screws 245 whose bodies are accommodated in complementary axial holes and whose heads rest against the lower radial face of the outside crown 224.

The stationary plate 240 has, in the axial cross-section, a general upside-down "U" shape that comprises an upper radial part 244 that extends radially and from which extend—axially downward—a lower axial part 246 located radially inside and another lower axial part 248 located radially outside.

The device 210 for distributing thermoplastic material comprises sealing means 250 that are arranged between the stationary part 212 and the movable part 214.

The sealing means 250 comprise a first sealing surface 252 combined with the stationary part 212 and a second sealing surface 254 combined with the movable part 214, with said first and second sealing surfaces 252 and 254 that extend radially being separated axially from one another by a gap 256.

In this second embodiment, the first sealing surface 252 associated with the stationary part 212 is supported by the stationary plate 240 and is formed by the upper face of the upper radial part 244 of said plate that can be seen in FIG. 8.

Figure 9:
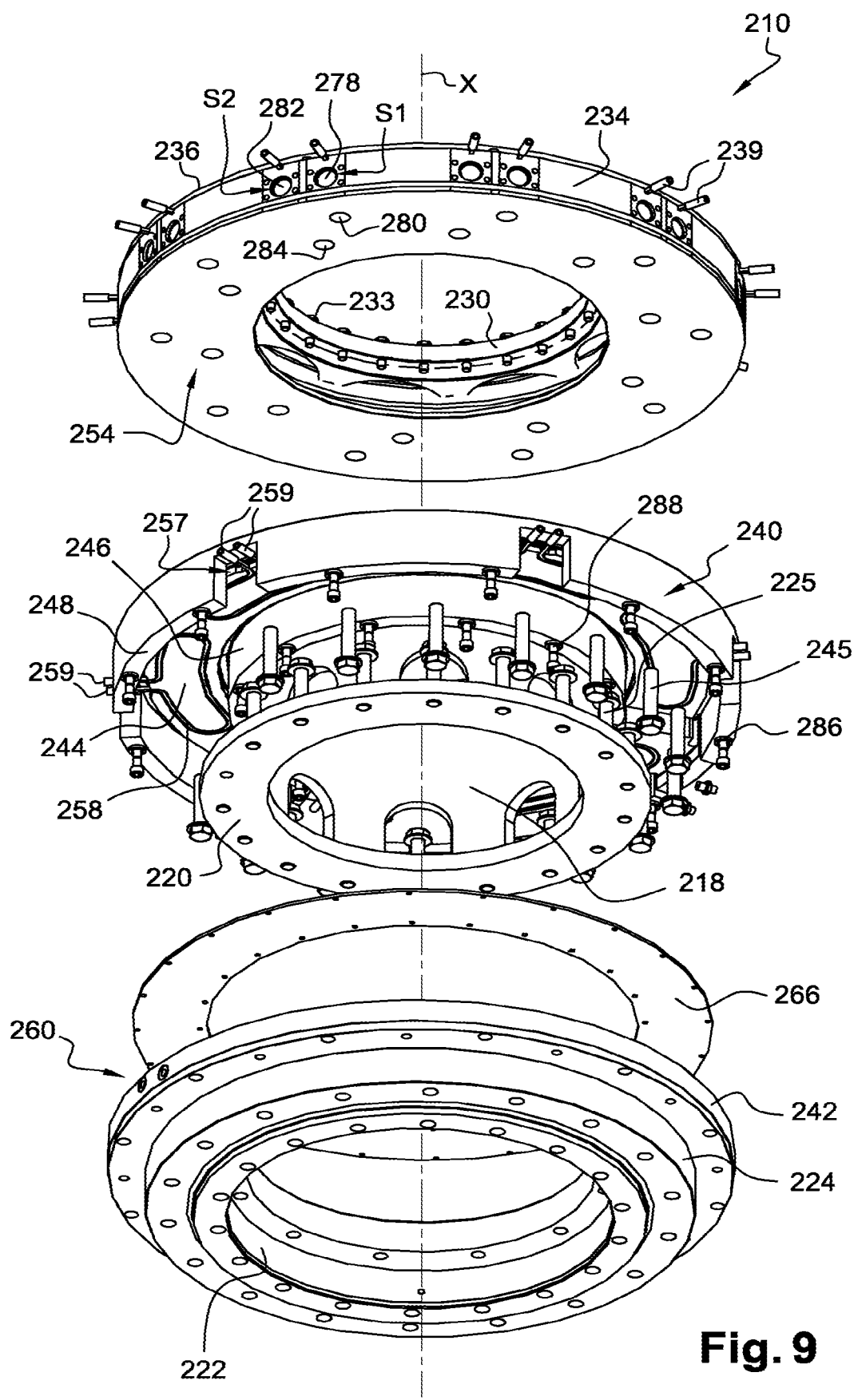

The second sealing surface 254 combined with the movable part 214 is supported by the rotating plate 234 and is formed by the lower radial face of said rotating plate 234 that can be seen in FIG. 9.

The stationary plate 240 comprises heating means 258 that are arranged, overall in the center, in the upper radial part 244 of the plate 240 or axially below the first sealing surface 252.

Preferably, the heating means 258 are formed by resistors that, like the heating means 238, are supplied electrically by connectors 259 that extend radially on the outside through openings 257 made for their passage into the outside axial part 248 of the stationary plate 240.

The stationary plate 240 in the shape of an upside-down "U" comprises a central recess 255 that is delimited, on the one hand, axially upward by the part 244 and downward by the crosspiece 242, and, on the other hand, radially toward the inside by the part 246 and toward the outside by the other part 248.

The recess 255 has an annular shape like in particular the plates 234, 240, and the volume corresponding to this recess 255 is filled with air that forms an insulator.

As in the first embodiment, the distribution device 210 comprises cooling means 260 that are combined with the sealing means 250 to modify the viscosity of the thermoplastic material that is present in the gap 256 between said sealing surfaces 252 and 254.

The cooling means 260 are doubled due to the double distribution circuit of the distribution device 210.

The cooling means 260 comprise a first cooling circuit 262 that is combined with the first distribution circuit that connects the inlet E1 to at least one outlet S1.

The cooling means 260 comprise a second cooling circuit 264 combined with the second distribution circuit that connects the inlet E2 to at least one outlet S2.

The cooling means 260 are made in the crosspiece 242, and the cooling circuits 262, 264 are closed in an airtight manner by a washer 266.

Sealing means (not shown) are interposed axially between the washer 266 that extends radially and the crosspiece 242 and located in such a way as to insulate the cooling circuits 262, 264 from one another.

The first cooling circuit 262 comprises at least one first annular groove 263, and the second cooling circuit 264 comprises at least one second annular groove 265, with said grooves 263, 265 respectively being made in the upper radial face of the crosspiece 242.

The first groove 263 of the first cooling circuit 262 is arranged radially outside of the second groove 265 of the second cooling circuit 264.

The cooling means 260 use a cooling fluid, such as water, with or without at least one additive, which is circulated in said circuits 262 and 264 for cooling radially the inside and the outside of the stationary plate 240.

In this second embodiment, the cooling means 260 are offset axially, here downward, in relation to the sealing means 250 and to the rotating plate 234 and to the stationary plate 240 that supports said sealing surfaces 252 and 254.

The cooling means 260 are not integrated with one and/or the other of said rotating plate 234 and stationary plate 240.

Advantageously, such an arrangement of the cooling means 260 makes it possible to reduce the general space requirement, in particular axial, of each of said plates 234, 240, which helps to achieve travel of reduced length inside of the distribution device 210.

The distribution device 210 comprises channeling means 268 for automatically constraining the thermoplastic material that is present in the gap 256 when the movable part 214 is driven in relation to the stationary part 212, or in this second embodiment when the rotating plate 234 is driven in rotation relative to the stationary plate 240.

Preferably, the channeling means 268 are made in the first sealing surface 252 supported by the stationary part 240.

With the two-material-type distribution device 210 comprising a double distribution circuit, like the cooling means 260 that are doubled, the channeling means 268 are also doubled.

The channeling means 268 comprise first channeling means 270 combined with the first circuit for distributing thermoplastic material and second channeling means 272 combined with the second circuit for distributing the other thermoplastic material.

The first channeling means 270 are shaped to constrain the thermoplastic material radially from the outside to the inside while the second channeling means 272 are shaped to constrain the other material radially from the inside to the outside.

As illustrated by FIG. 8, the first channeling means 270 and the second channeling means 272 are concentric, with the second means being arranged radially inside of the first.

Each of the channeling means 270, 272 comprises two concentric spirals that determine between them an annular track in such a way that said first and second distribution circuits remain insulated in relation to one another, without any mixing between the materials being able to occur inside of the device 210.

The first channeling means 270 comprise at least one radially outer spiral 269 and one radially inner spiral 271. Each of the spirals 269 and 271 is shaped to constrain the thermoplastic material on the first annular track that said spirals 269 and 271 delimit radially between one another in the first sealing surface 252.

The outer spiral 269 will automatically constrain the thermoplastic material radially from the outside to the inside while the inner spiral 271 will radially constrain said material from the inside to the outside.

In the same way for the second channeling means 272, the inner spiral 273 will radially constrain said material from the inside to the outside while the outer spiral 275 will automatically constrain the thermoplastic material radially from the outside to the inside.

As for the first channeling means 270, the second channeling means 272 will automatically constrain the other or second thermoplastic material on the annular track that is delimited radially by said spirals 273, 275 respectively.

The second heating means 258 arranged in the middle of the radial part 244, between said inside and outside axial parts 246 and 248, of the stationary plate 240 will heat locally—in the vicinity of the spirals 271 and 275—the part of the thermoplastic material that is present in the gap 256.

Radially opposite the second heating means 258 and on both sides, the thermoplastic material that is present in the gap 256 will be respectively cooled by the cooling means 260 to increase the viscosity thereof so as to form a joint with the material itself.

The first cooling circuit 262 will cool the thermoplastic material that comes into contact with the outer spiral 269 of the first channeling means 270 so as to increase the viscosity thereof.

The cooling of the outer radial periphery of the axial part 244 of the stationary plate 240 is carried out through the outer axial part 248 that advantageously forms a thermal bridge between this zone and the crosspiece 242 that comprises the first cooling circuit 262.

The second cooling circuit 264 will cool the thermoplastic material that comes into contact with the inner spiral 273 of the second channeling means 272 so as to increase the viscosity thereof.

The cooling of the inner radial periphery of the axial part 244 of the stationary plate 240 is carried out through the inner axial part 246 that advantageously forms a thermal bridge between this inner zone and the crosspiece 242 that comprises the second cooling circuit 264.

Owing to such an arrangement, a temperature gradient between the central part of the axial part 244 of the stationary plate 240 combined with the second heating means 258 and each of the outer and inner ends of said axial part 244 respectively cooled by the first cooling circuit 262 and the second cooling circuit 264 is obtained radially.

The first temperature gradient is produced radially from the center toward the outside through the first track of the first surface 252 to increase the viscosity radially toward the outside and to make it possible for the outer spiral 269 to channel the thermoplastic material radially in the opposite direction, toward the inside, owing to which the thermoplastic material does not escape beyond the gap 256, and the sealing of the first distribution circuit is obtained.

In an analogous manner for the second circuit for distributing the other thermoplastic material, a second temperature gradient is produced radically from the center toward the inside through the second track of the first sealing surface 252.

Advantageously, such a temperature gradient makes it possible to increase the viscosity radially toward the inside and with the inner spiral 273 to channel the other thermoplastic material radially in the opposite direction, or toward the inside, so that the other thermoplastic material does not escape radially outside of the gap 256 and so that the sealing of the second circuit for distributing this other thermoplastic material is ensured.

Owing to the cooling means 260 and the channeling means 268 that act when the movable part 214 is driven in rotation relative to the stationary part 212, the sealing of at least one, here two, circuit(s) of the distribution device 210 is achieved relative to the thermoplastic material that circulates on the inside.

The first thermoplastic material is introduced radially from the outside via the inlet E1 and, after a right-angled elbow, then passes through a groove 274 in an arc that is made in the stationary plate 240 that is open axially upward.

A portion of the thermoplastic material then flows radially into the gap 256 of the sealing means 250, more specifically on the first track, to ensure the sealing of the first distribution circuit as explained above.

For its part, the other portion of the thermoplastic material rises axially upward in the rotating plate 234 up to the outlet S1.

The rotating plate 234 comprises an outlet pipe 278 that is shown in FIG. 10; said pipe 278 comprises a radial section and an axial section that are connected to one another here by a right-angled elbow.

The end of the pipe 278 that empties radially constitutes said outlet S1. The other end empties axially into the second sealing surface 254 through an opening 280 by which the thermoplastic material that comes from the stationary plate 240 and that has passed through the sealing means 250 penetrates into the pipe 278.

According to one of the characteristics of the distribution device 210, the device 210 comprises a second circuit for distributing another thermoplastic material that is introduced via the inlet E2 and that is distributed via the outlet S2.

The travel of the second material in the device 210 is similar to that which was just described: introduced radially from the outside via the inlet E2, the material passes through the stationary plate 240 until, axially exiting upward via a groove 276 in an arc, it axially passes through the gap 256 of the sealing means 250 until axially penetrating the pipe 282 of the rotating plate 234 (analogous to the pipe 278) via an opening 284.

As explained above, a portion of the second thermoplastic material will flow into the gap 256 in the area of the second track that is delimited by the second channeling means 272 so as to ensure the sealing of the second circuit for distributing said second material, with sealing between the stationary plate 240 and the rotating plate 234.

According to another characteristic, the distribution device 210 simultaneously supplies with thermoplastic material—starting from an inlet such as the inlet E1—at least a first outlet S1 and a second outlet S'1.

The distribution device 210 comprises at least one groove 274 that extends circumferentially to supply—from an inlet E1—at least two radial distribution pipes, such as the pipe 278, which are circumferentially consecutive.

Advantageously, the second distribution circuit also makes possible a simultaneous distribution of material at more than one outlet, with the other material introduced via the inlet E2 being distributed via the groove 276 toward at least a first outlet S2 and a second outlet S'2.

Advantageously, the first cooling circuit 262 comprises washers 286 that are mounted around the connecting means, such as small columns, axially connecting the outside axial part 248 of the stationary plate 240 at the crosspiece 242.

The washers 286 are axially interposed between the lower radial face of the free end of the outside axial part 248 of the stationary plate 240 and the upper radial face of the washer 266 that covers the crosspiece 242.

Preferably, washers 288 are also interposed axially in a similar manner between the inside axial part 246 of the stationary plate 240 and the crosspiece 242.

Advantageously, the washers 286 and 288 help with the control of the thermal bridge established between the crosspiece 242 comprising said cooling circuits 262, 264 and the outer and inner radial peripheries of the part 244 of the stationary plate 240 comprising the first sealing surface 252.

Advantageously, the air volume that is present in the recess 255 forms an insulator that also helps to establish the thermal bridge between the cooling means 260 and the stationary plate 240.

As a variant, not shown, the cooling means 260 are integrated in one and/or the other of said rotating plate 234 and stationary plate 240.

Preferably, the cooling means 260 are combined with that of said movable part 214 or stationary part 212, for example, said rotating plate 234 or stationary plate 240, comprising said channeling means 268.

As a variant, not shown, the distribution device 210 comprises depressurization means for controlling the pressure exerted by the thermoplastic material inside of the distribution device.

As a variant, not shown, the distribution device 210 comprises purging means, with said purging means advantageously forming the depressurization means.

The invention claimed is:

1. Device (10, 210) for distributing thermoplastic material to a preform molding machine designed for the manufacturing of containers, with said device (10, 210) comprising at least one stationary part (12, 212) and one movable part (14, 214) that is driven in rotation in relation to said stationary part (12, 212) around an axis (X) of the device and comprising a seal (50, 250) arranged between at least the stationary part (12, 212) and the movable part, wherein:
   the stationary part comprises at least one feed inlet (E) connected to a source for supplying thermoplastic material and the moveable part (14, 214) comprises at least one outlet (S) for distributing said thermoplastic material to units of said preform molding machine said seal (50, 250) comprise a first sealing surface (52, 252) that is integral with the stationary part (12, 212) and a second sealing surface (54, 254) that is linked in movement to the movable part (12, 214), with said first and second sealing surfaces extending radially along a seal plan perpendicular to said axis of the device and being separated axially from one another by a gap (56, 256) into which can flow a portion of the thermoplastic material in circulation between the feed inlet (E) and the at least one outlet (S),
   the movable part (14, 214) comprises a pipe (20, 278) connected to said at least one distribution outlet (S), the pipe (20, 278) having a gap opening into the gap (56, 256), the fixed part (14, 214) being arranged so that the thermoplastic material coming from the supply inlet (E) penetrates the gap opening having passed through the seal (50, 250),
   at least one of said first and second sealing surfaces (52, 54, 252, 254) comprising channeling (58, 268) structured for radially constraining the thermoplastic material of the seal when the movable part (14, 214) is driven in relation to the stationary part (12, 212) and
   said seal (50, 250) comprises at least one associated cooling circuit (60, 260) located radially remote from the gap opening (20a, 280) to obtain a temperature of thermoplastic material of the seal considered at a radial distance from the gap opening follows a temperature gradient along a radial direction in order to increase the viscosity of said thermoplastic material to form the seal as the radial distance increases.

2. Device according to claim 1, wherein said cooling circuit (60, 260) is combined with said seal (50, 250) to keep the thermoplastic material located radially remote from the gap opening at a specified set-point temperature (Tc) that is less than its melting point (Tf) of the thermoplastic material.

3. Device according to claim 1, wherein the channeling (58, 268) consists of at least one spiral made in one of said sealing surfaces (52, 54, 252, 254).

4. Device according to claim 1, wherein the device comprises a depressurization valve (90) for controlling the pressure exerted by the thermoplastic material inside of the distribution device.

5. Device according to claim 1, wherein the device comprises a purging outlet (122) for purging at least one portion of the thermoplastic material that is present inside said device.

6. Device according to claim 1, wherein the device comprises a heating circuit located in specified zones inside of the device for heating the thermoplastic material so as to keep said thermoplastic material at a temperature (T) that is higher than or equal to the melting point (Tf).

7. Device according to claim 1, wherein the device (10, 210) comprises at least a heating circuit (120, 238, 258) that, combined with the seal (50, 250), are located close to at least one of said sealing surfaces (52, 54, 252, 254) for heating a portion of the thermoplastic material that is present in the gap (56, 256).

8. Device according to claim 5, wherein the device comprises a purging assistance injector that can introduce a pressurized fluid, in the direction opposite to that of the circulation of the thermoplastic material inside the device, to facilitate an evacuation of the thermoplastic material during a purging operation.

9. Device according to claim 1, wherein the device comprises an element that forms a plunger that is introduced selectively to reduce locally the cross-section of thermoplastic material.

10. Device according to claim 1, wherein said device is of general "O" design and comprises a central axial passage.

11. Device according to claim 1, wherein the device comprises at least one distribution circuit that simultaneously supplies—from one inlet—at least two radial distribution channels that are circumferentially consecutive.

12. Device according to claim 1, wherein the device comprises a double circuit for distributing thermoplastic material, or comprises at least one first circuit for distributing a thermoplastic material and a second circuit for distributing another thermoplastic material.

13. Device according to claim 2, wherein the channeling (58, 268) consist of at least one spiral made in one of said sealing surfaces (52, 54, 252, 254).

14. Device according to claim 2, wherein the device comprises depressurization valve (90) for controlling the pressure exerted by the thermoplastic material inside of the distribution device.

15. Device according to claim 3, wherein the device comprises depressurization valve (90) for controlling the pressure exerted by the thermoplastic material inside of the distribution device.

16. Device according to claim 2, wherein the device comprises purging outlet (122) for purging at least one portion of the thermoplastic material that is present inside said device.

17. Device according to claim 3, wherein the device comprises purging outlet (122) for purging at least one portion of the thermoplastic material that is present inside said device.

18. Device according to claim 4, wherein the device comprises purging outlet (122) for purging at least one portion of the thermoplastic material that is present inside said device.

19. Device according to claim 2, wherein the device comprises heating circuit located in specified zones inside of the device for heating the thermoplastic material so as to keep said thermoplastic material at a temperature (T) that is higher than or equal to the melting point (Tf).

20. Device according to claim 3, wherein the device comprises heating circuit located in specified zones inside of the device for heating the thermoplastic material so as to keep said thermoplastic material at a temperature (T) that is higher than or equal to the melting point (Tf).

* * * * *